(12) United States Patent
Chishinski

(10) Patent No.: US 7,036,767 B2
(45) Date of Patent: May 2, 2006

(54) PROJECTILE SEEKER

(75) Inventor: Ehud Chishinski, Nofit (IL)

(73) Assignee: Rafael-Armament Development Authority Ltd., Haifa (IL)

( * ) Notice: Subject to any disclaimer, the term of this patent is extended or adjusted under 35 U.S.C. 154(b) by 0 days.

(21) Appl. No.: 11/128,657

(22) Filed: May 13, 2005

(65) Prior Publication Data

US 2006/0054734 A1    Mar. 16, 2006

(30) Foreign Application Priority Data

May 17, 2004 (IL) ..................... 162032

(51) Int. Cl.
    *F41G 7/00*      (2006.01)
(52) U.S. Cl. ............. 244/3.16; 244/3.1; 244/3.11; 244/3.13; 244/3.15; 244/3.17
(58) Field of Classification Search ......... 244/3.1–3.3
    See application file for complete search history.

(56) References Cited

U.S. PATENT DOCUMENTS

| | | | | |
|---|---|---|---|---|
| 4,105,174 A | * | 8/1978 | Blomqvist et al. ......... | 244/3.16 |
| 4,245,890 A | * | 1/1981 | Hartman et al. ........... | 244/3.16 |
| 4,717,822 A | * | 1/1988 | Byren ....................... | 244/3.16 |
| 5,259,570 A | * | 11/1993 | Sochard ..................... | 244/3.16 |
| 5,333,815 A | * | 8/1994 | Sardanowsky ............. | 244/3.16 |
| 5,368,254 A | * | 11/1994 | Wickholm ................. | 244/3.16 |
| 5,372,333 A | * | 12/1994 | Uwira et al. ............... | 244/3.16 |
| 5,647,560 A | * | 7/1997 | Schnatz et al. ............ | 244/3.15 |
| 5,669,580 A | * | 9/1997 | Strauss ...................... | 244/3.16 |
| 5,681,009 A | * | 10/1997 | Vandersteen et al. ...... | 244/3.16 |
| 5,693,907 A | * | 12/1997 | Rudnik ...................... | 244/3.16 |
| 5,762,292 A | * | 6/1998 | Schweyer et al. ......... | 244/3.17 |
| 5,791,591 A | * | 8/1998 | Hoban ....................... | 244/3.16 |
| 5,836,540 A | * | 11/1998 | Romer et al. .............. | 244/3.16 |
| 6,028,712 A | * | 2/2000 | McKenney et al. ........ | 244/3.17 |
| 6,076,765 A | * | 6/2000 | Horwath .................... | 244/3.16 |

(Continued)

FOREIGN PATENT DOCUMENTS

WO       WO 98/31978       7/1998

OTHER PUBLICATIONS

Driggers R G et al: "Parameters of Spinning FM Reticles" Applied Optics, Optical Society of Ametica, Washington, US, vol. 30, No. 7, Mar. 1, 1991 pp. 887-895.

*Primary Examiner*—Bernarr E. Gregory
(74) *Attorney, Agent, or Firm*—Ohlandt, Greeley, Ruggiero & Perle, L.L.P.

(57) ABSTRACT

The present invention relates to a projectile seeker which comprises: (a) A hollow in the projectile for accommodating a light sensor; (b) A light sensor located within said hollow for sensing light which is emitted or reflected from a target, and for producing an electronic signal upon sensing such emitted light; and (c) A longitudinal shaped opening at the slanted front-side surface of the projectile for enabling a shaped field of view to said light sensor which is limited by the boundaries of said opening, the opening width varies in a direction from the front to the back of the projectile in order to cause said electronic signal to depend on the spinning of the projectile and to be proportional to the orientation of the projectile with respect to the object.

18 Claims, 6 Drawing Sheets

U.S. PATENT DOCUMENTS

| | | | |
|---|---|---|---|
| 6,138,944 A * | 10/2000 | McCowan et al. | 244/3.17 |
| 6,180,938 B1 * | 1/2001 | Crowther et al. | 244/3.17 |
| 6,310,730 B1 * | 10/2001 | Knapp et al. | 244/3.17 |
| 6,357,695 B1 * | 3/2002 | Horwath | 244/3.16 |
| 6,462,889 B1 * | 10/2002 | Jackson | 244/3.17 |
| 6,525,809 B1 * | 2/2003 | Perkins | 244/3.16 |
| 6,606,066 B1 | 8/2003 | Fawcett et al. | |
| 6,648,433 B1 * | 11/2003 | Kusic | 244/3.23 |
| 6,851,645 B1 * | 2/2005 | Williams et al. | 244/3.16 |
| 6,910,658 B1 * | 6/2005 | Hart et al. | 244/3.12 |

\* cited by examiner

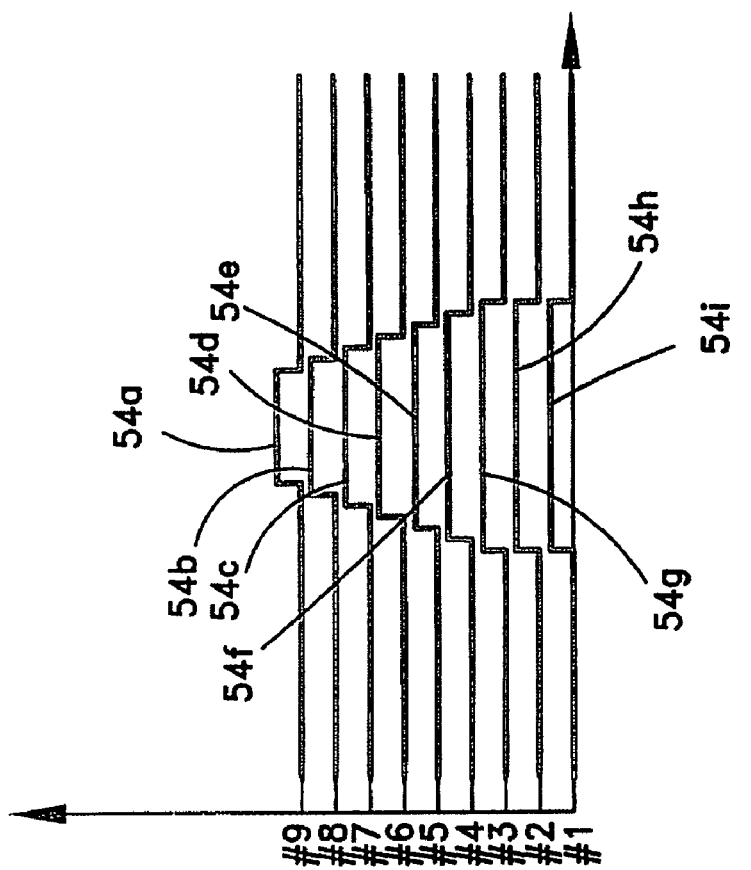
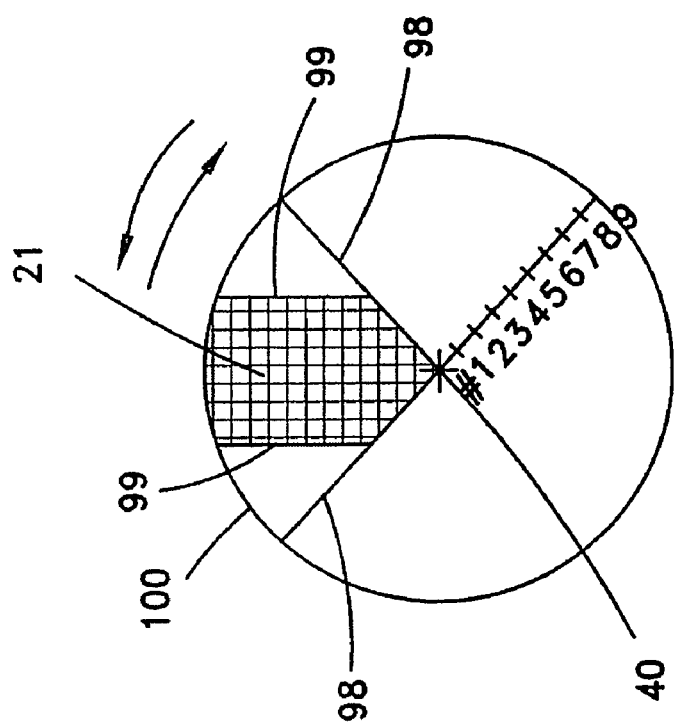
Fig. 4a
Fig. 4

PROJECTILE SEEKER

FIELD OF THE INVENTION

The field of the invention relates to guiding means for a spinning projectile. More particularly, the present invention relates to an optical guiding seeker for a spinning projectile which is based on a shaped opening within the projectile.

BACKGROUND OF THE INVENTION

Optical seekers for use in guidance of spinning projectiles or spinning missiles (hereinafter, when the term "projectile" is used, it should be understood that it relates also to a "missile", and vice versa, when the term "missile" is used, it should be understood that it relates also to a "projectile") are known in the art. Such a seeker generally senses during the projectile flight light that is emitted or reflected from the target, and produces a signal, which is proportional to the deviation of the projectile direction from correct course toward the emitted light, i.e., the target. The correcting signal is then conveyed to a guiding or correcting unit within the projectile, which in turn performs the required course correction.

WO 98/31978 discloses a reticle for use in a guidance seeker for a spinning projectile. The projectile has a front opening, through which the light from the target can enter, and an essentially cylindrical hollow behind said opening in which the reticle and some additional optical elements are disposed. On the reticle, opaque lines are disposed in a specific manner. Light coming from the object and passes through the reticle is interrupted on its way to a light sensor by said lines due to the spinning of the projectile, therefore producing a modulated light signal which is relative to the deviation of the projectile direction from the route to the target. This modulated light, when sensed by a light sensor suitable for sensing light in the relevant wavelength, can be used for correcting the projectile route toward the target. The arrangement as suggested in WO 98/31978 is well suited for analog signal processing. This is particularly due to the form of the signals produced by the seeker of WO 98/31978, signals which are generally Pulse Width Modulated (PWM) signals. Other publications disclose reticles which produce AM signals that can be interpreted in a similar manner.

It is an object of the invention to provide a seeker for use in guiding a spinning projectile, which is very simple, compact in structure, and more suitable for digital signal processing.

It is still another object of the present invention to simplify the manner and circuitry needed for the processing of the output signals.

It is another object of the invention to provide a seeker for use in guiding a spinning projectile, which can be mounted on a projectile or missile having essentially any caliber.

It is still another object of the invention to provide a seeker for use in guiding a spinning projectile, in which the number of optical and electrical elements is reduced to a minimum.

It is still another object of the invention to provide a seeker for use in guiding a spinning projectile, which is simple to manufacture.

Other objects of the invention will become apparent as the description proceeds.

SUMMARY OF THE INVENTION

The present invention relates to a projectile seeker which comprises: (a) A hollow in the projectile for accommodating a light sensor; (b) A light sensor located within said hollow for sensing light which is emitted or reflected from a target, and for producing an electronic signal upon sensing such emitted light; and (c) A longitudinal shaped opening at the slanted front-side surface of the projectile for enabling a shaped field of view to said light sensor which is limited by the boundaries of said opening, the opening width varies in a direction from the front to the back of the projectile in order to cause said electronic signal to depend on the spinning of the projectile and to be proportional to the orientation of the projectile with respect to the object.

Preferably, in transversal cross section of the projectile, at least one boundary of the shaped opening is at most only partially, if at all coincides, with an imaginary radial line in said the transversal cross-section.

Preferably, the opening is covered, and the cover is transparent to only a specific light wavelength.

Preferably, the seeker comprises a filter for allowing passage of light only in a specific wavelength to the light sensor.

Preferably, the wavelength of the emitted or reflected light is specific, and the said light sensor is limited to sense light only in said specific wavelength.

Preferably, the projectile is further provided with a processor for receiving said electronic signal and for calculating from said electronic signal one or more correcting signals that are provided to a flight correcting unit within the projectile.

Preferably, the flight correcting unit is capable of correcting the projectile flight based on said correcting signals.

Preferably, the flight correcting unit comprises one or more jets around the projectile, and wherein said correcting signals determine the jets for activation, time of activation, and amount of thrust to be produced by each jet.

Preferably, the flight correcting unit comprises wings whose locations and/or orientations are changed based on said correcting signals.

Preferably, the width of the opening is increased in the direction from the front to the back of the projectile.

Preferably, the opening width increase is non-linearily changed in the direction from the front to the back of the projectile.

Preferably, the width of the opening is decreased in the direction from the front to the back of the projectile.

Preferably, the opening width decrease is non-linearily changed in the direction from the front to the back of the projectile.

The invention also relates to a projectile seeking system which comprises a seeker as described, and a light pointer for impinging light on the target, and wherein the light sensor of the seeker is adapted to sense light in the wavelength of the light produced by the light pointer.

Preferably, the wavelength of the emitted or reflected light is within the UV bandwidth.

Preferably, the wavelength of the emitted or reflected light is within the IR bandwidth.

Preferably, the seeker is further provided with timer means for determining the time of activation of the processor.

Preferably, said timer means is fed with the range to the target and with the projectile velocity prior to shooting, in order to determine said processor activation time.

BRIEF DESCRIPTION OF THE DRAWINGS

In the Drawings:

FIG. 2a shows a front view of a projectile, according to an embodiment of the invention;

FIG. 2b shows a rear view of a projectile, according to an embodiment of the invention;

FIG. 4 shows a front view of a projectile according to a first embodiment of the invention;

FIG. 4a shows signals corresponding to the shape of the cover of FIG. 4, which can be used for the determination of the accuracy of direction;

DETAILED DESCRIPTION OF PREFERRED EMBODIMENTS

Figure 1:
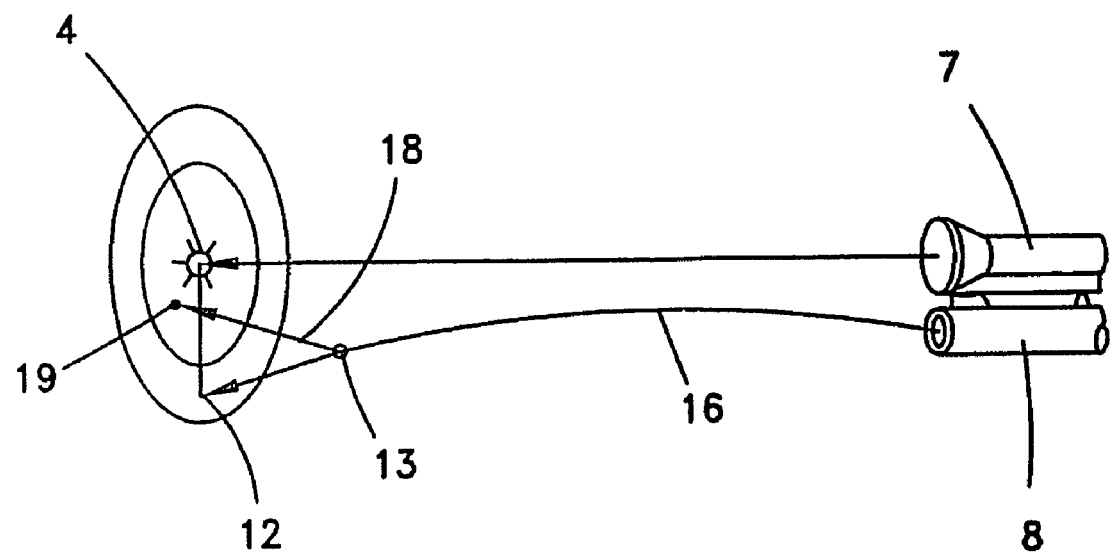
FIG. 1 illustrates in general the system and object of the invention.

FIG. 1 briefly illustrates the targeting procedure which is performed according to an embodiment of the present invention.

According to an embodiment of the present invention, a light source or pointer 7 is used for marking a point of light on the target. Such light pointer may be, for example, a laser or infra-red source capable of transmitting a narrow and concentrated light ray. The light pointer may be mounted, for example, on the projectile launcher 8, but this is not a requirement, as it may be separated thereof, for example, the pointer may be operated by another party. Alternatively, the invention may operate with a light which is emitted from the target. The invention can operate as long as a light-point exists on the target or emitted by it, and is noticeable by a light sensor located within the projectile. The pointer light is preferably limited to a specific wavelength, distinguished from the surrounding light.

In the embodiment of FIG. 1, a light pointer 7 is provided on launcher 8. Before launching the projectile, the user directs the launcher 8 and pointer 7 towards a target, and turns on the pointer light, which in turn produces a target 4. Then, the user launches the projectile 17. The projectile 17 generally goes along a trajectory 16 in its route towards the target (indicated by target light spot 4). An object of the invention is to determine, some distance before the target 4, the deviation of the projectile 7 from the route to the target, and to provide correction that will direct the projectile to hit or as close as possible, or at least closer to target 4. For example, launching projectile along trajectory 16 with no intervention will provide hitting at point 12 relatively far from target 4. According to the present invention, when such a deviation from the target is determined, for example while the projectile is at point 13, a correction is made in order to deviate the projectile 7 to a corrected route 18 that will result in hitting at point 19 much closer to target 4.

Figure 2:
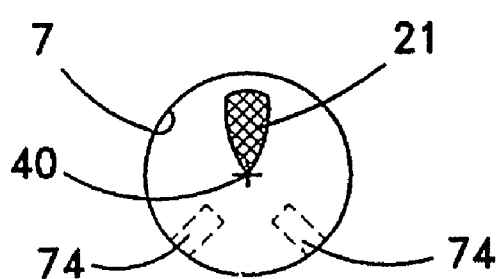
FIG. 2 shows a side view of a projectile, according to an embodiment of the invention.
Figure 2:
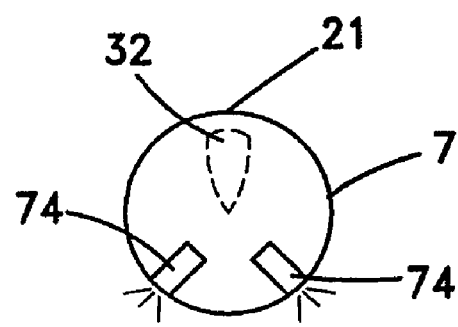
Figure 2:
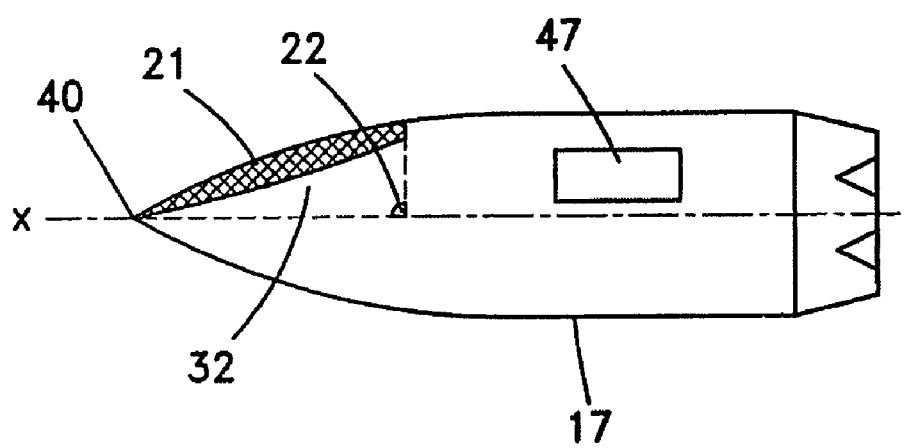

FIGS. 2, 2a and 2b show a general structure of the projectile 17 according to an embodiment of the present invention. FIG. 2a shows a front view of the projectile, and FIG. 2b shows a rear view of the projectile. The projectile 17 is provided with a shaped, transparent opening 21 which is made on the slanted front-side surface of the projectile, and a hollow 32 in which a light sensor 22 is positioned. The projectile is provided with an optical arrangement (not indicated) causing the light emitted from the target 4 (see FIG. 1), which is impinged on any portion of opening 21 to arrive sensor 22. Such optical arrangement may include conventional optical elements, such as one or more lenses, mirrors, etc. The cover 21, or optionally the optical arrangement or the sensor 22 itself generally include a filter that transfers light selectively, i.e., only in the spectrum of light spot 4. For example, if a laser pointer is used to produce light spot 4, the filters allows only laser light to pass, and the sensor senses only light in the laser spectrum.

Therefore, light from the target 4 reach sensor 22 as long as any portion of cover 21 faces light spot 4. On the other hand, dark is sensed by sensor 22 as long as no portion of cover 21 faces the light spot 4.

The present invention assumes the following assumptions:

1. The longitudinal velocity vector of the projectile is essentially constant (at least during the relevant time of the measurement needed for the correction determination)
2. The angular velocity of the projectile is essentially constant (at least during the relevant time of the measurement needed for the correction determination);
3. The velocity vector of the projectile coincides with the longitudinal axis x (see FIG. 2) of the projectile.

Figure 5A:
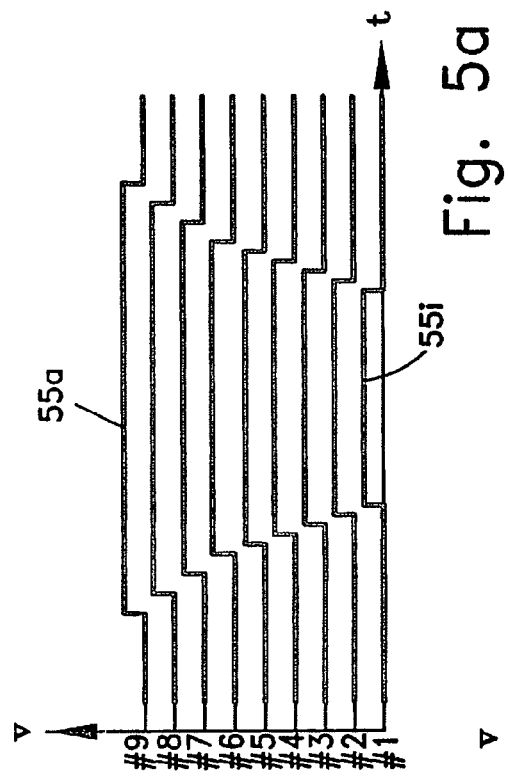
FIG. 5a shows signals corresponding to the shape of the cover of FIG. 5, which can be used for the determination of the accuracy of direction.
Figure 6A:
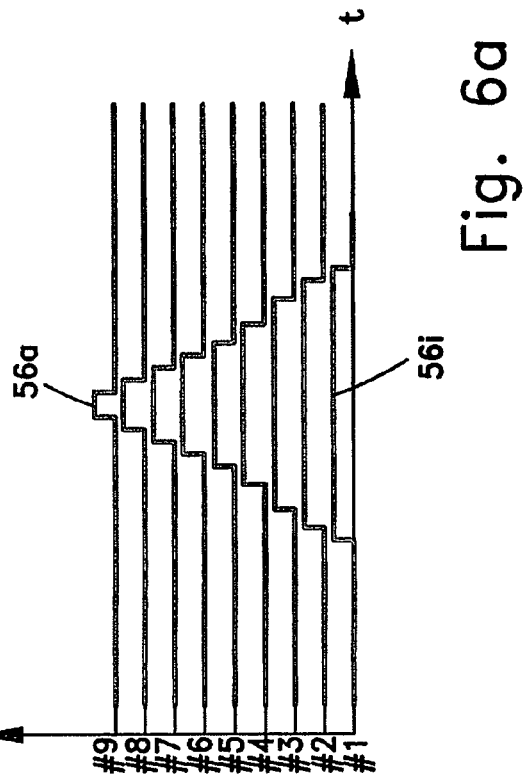
FIG. 6a shows signals corresponding to the shape of the cover of FIG. 6, which can be used for the determination of the accuracy of direction.
Figure 5:
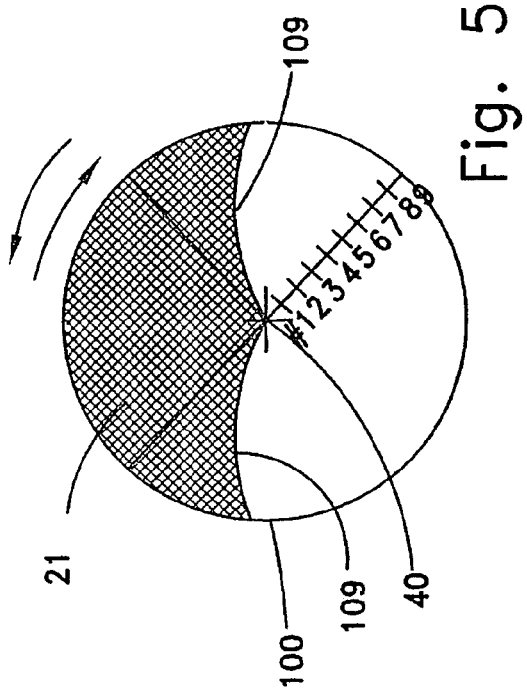
FIG. 5 shows a front view of a projectile according to a second embodiment of the invention.
Figure 6:
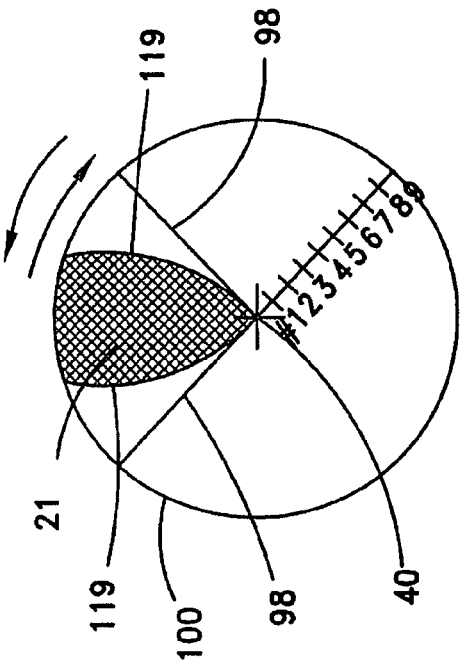
FIG. 6 shows a front view of a projectile according to a third embodiment of the invention.

FIGS. 4, 5, and 6 show three examples for the shape of the opening 21, as seen from the front of the projectile 17. FIGS. 4a, 4b, and 4c show 3 corresponding approximate signal diagrams that are produced by the sensor 22, depending on the deviation of the spinning projectile axis from the target.

FIGS. 4, 5, and 6 all show a front view of a projectile, having three different types of shapes of cover 21. The front profile 100 of the projectile is of course circular. As said, the projectile 17 spins during its flight towards the target. During the flight, the light spot 4 is alternatively sensed by sensor 22, depending on whether cover 21 faces the light spot or not. Furthermore, and with respect to FIGS. 4, 5, and 6, the better the direction of the projectile towards the target light spot 4 is, the closer to the center 40 of the projectile the spot image is impinged. In other words, during the spinning of the projectile on its way towards the target, light spot 4 produces a virtual circle on the front profile 100 of projectile 17. The radius of said virtual circle is used by the present invention as an indication for the accuracy of direction towards the target. Such an indication (i.e., the distance from the center) for the accuracy of direction was actually known by the prior art, and WO 98/31978, for example, proposes a reticle with lines disposed on it in a specific arrangement in order to produce a modulated signal which is a function of the distance from the center, thereby enabling determination the direction accuracy.

The present invention proposes another way for determining the accuracy of direction. According to the present invention, the shape of cover 21 enables such accuracy determination. More particularly, and as shown in FIGS. 4, 5, and 6, the borders of the opening are so designed that they are not coincide (as in FIGS. 5 and 6) with any radial lines 98 of circle 100, or at most partially coincide (as in FIG. 4) with such lines. It has been found by the inventor that if the cover edges are so shaped, the determination of the direction accuracy is possible.

FIGS. 4a, 5a, and 6a, respectively show signals that enable determination of the direction accuracy for the cover shapes of FIGS. 4, 5, and 6. The signals indicated as numerals #1–#9 in FIGS. 4a, 5a, and 6a relate respectively to circles of radius #1–#9 of FIGS. 4, 5, and 6.

With reference to FIG. 4, in a case (not the one shown) when cover 21 spans the whole area between radial lines 98, the resulted signals, no matter how accurate the projectile direction is, are the same. For example, this is the reason why signals 54g, 54h, and 54i are the same. However, it can be seen that signals 54a–54f differ one from the other, thanks to the shape of the cover 21 farther from the center. Therefore, the determination of the accuracy of direction can be made in the range of circles #4–#9 in the embodiment of FIG. 4. In the range of circles #1–#3 it can be assumed that the accuracy of direction is better that within circles #4–#9, but no further determination can be made. In any case, within circles #4–#9 it can be seen that the farther from the center the light spot impinges on cover 21, and the larger the radius is, the shorter the resulted pulse duration becomes. Furthermore, as the period of completion of one projectile spin is given, the duty cycle of the signals #4–#9 can be used for the determination of the accuracy of direction.

In the embodiment of FIGS. 5 and 5a the duration of the pulses increases as the distance from the center increases in view of the shape of the cover 21 of FIG. 5 Also, the duty cycle increases as the distance from the center increases. More particularly, the pulse #1 relating to the smallest radius #1 has a shorter duration than the duration of pulse #9 relating to the largest radius #9. The change in pulse duration follows the curvature, or more generally, the function of lines 109. Therefore, the accuracy of the projectile direction can be determined by measurement of the duration of the pulse, or of the duty cycle, and given the shape of the cover border lines.

In the embodiment of FIGS. 6 and 6a the duration of the pulses decreases as the distance from the center increases in view of the shape of the cover 21 of FIG. 6. Also, the duty cycle decreases as the distance from the center increases. For example, the pulse #1 relating to the smallest radius #1 has a longer duration than the duration the other pulses #2–#9. The change in pulse duration follows the curvature, or more generally, the function of the cover 21 border lines 119.

The present invention can therefore determine the rate of the projectile route accuracy to the target, and therefore also can determine the rate of correction which is required. In one embodiment of the invention, the correction is made by means of providing a correction impulse at the back of the projectile. Therefore, the determination of the correcting impulse involves determination of both its absolute volume, and its direction. The absolute volume of the required impulse of correction is determined from the duty cycle or the width of the pulse that is generated by sensor 22 and it of course depends on the shape of the cover. More particularly, as has been shown with respect to FIGS. 4, 5, 6, the direction accuracy of the projectile is a function of the pulse width, and this is the case as long as the cover 21 shape does not fully coincides with radial lines such as 98.

Preferably, the correction is made when a projectile is in close range to the target.

Figure 7:
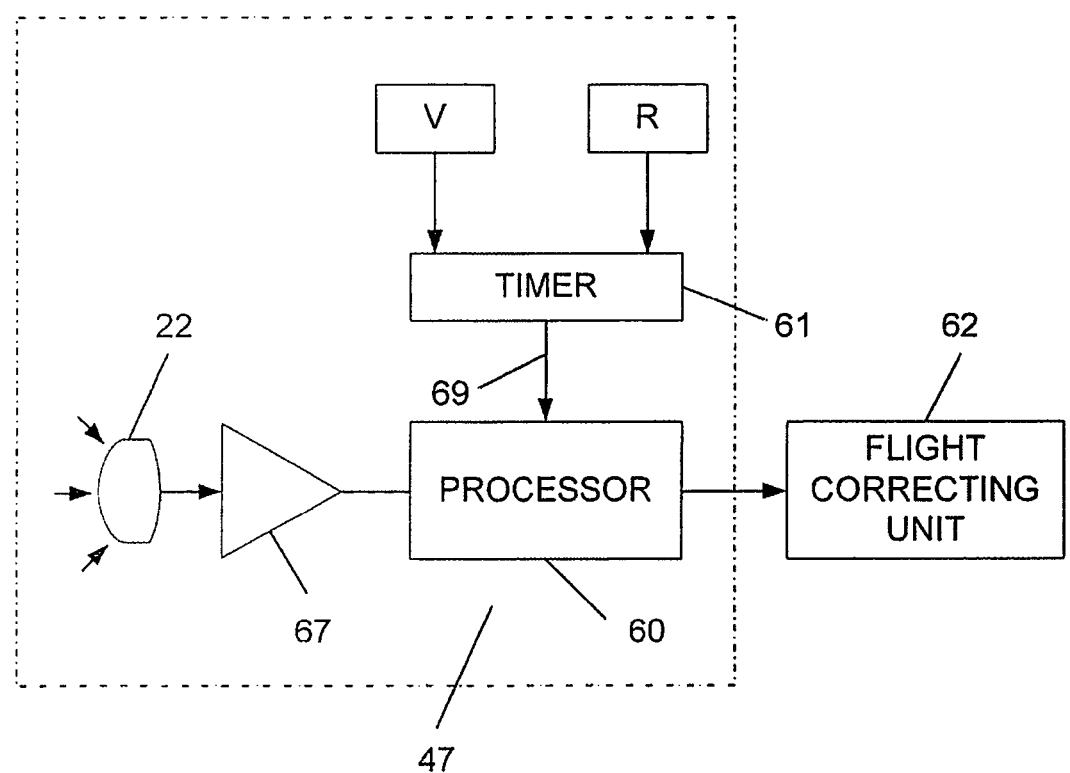
FIG. 7 illustrates in block diagram form the procedure for providing flight correction to a projectile, according to an embodiment of the invention.

The projectile also comprises an electronic circuitry 47 (indicated in FIG. 2) for performing the projectile correction. FIG. 7 shows in block diagram form the structure of said circuitry 47 according to an embodiment of the invention. The pulses as received from the sensor 22 are provided into a pre-amplifier 67, which amplifies the pulses and conveys them into processor 60. Timer 61 activates processor 60 at a predetermined time, for example at a time in which the projectile is close to the target (and in which a minimal correction is required). The timer may determine this activation time from the parameter R of the range to the target and from the known velocity V of the projectile. The range to the target can be determined before the shooting by any known technique, for example, by means of using a range finder. The processor starts processing the inputs from pre-amplifier 67 upon receipt of the activating signal 69 from timer 61, and it determines the amplitude and direction of the correcting signal, which is thereafter provided to the flight correcting unit 62. The flight correcting unit 62 may, for example comprise two or more jets 74, that are disposed at the back of the projectile 70 as shown in FIG. 2b. Each of the jets is capable of providing thrust to a specific direction. The amplitude and direction of the correcting impulse thrust may therefore be a sum of the thrust as resulted from the activation of two or more of such jets 74. In that case, the processor 60 determines the time of activation of the jets, the specific jets for activation (if there are more than two), and the amount of thrust which is activated by each jet, if this option is available, in order to acquire the desired impulse of correction.

Figure 3:
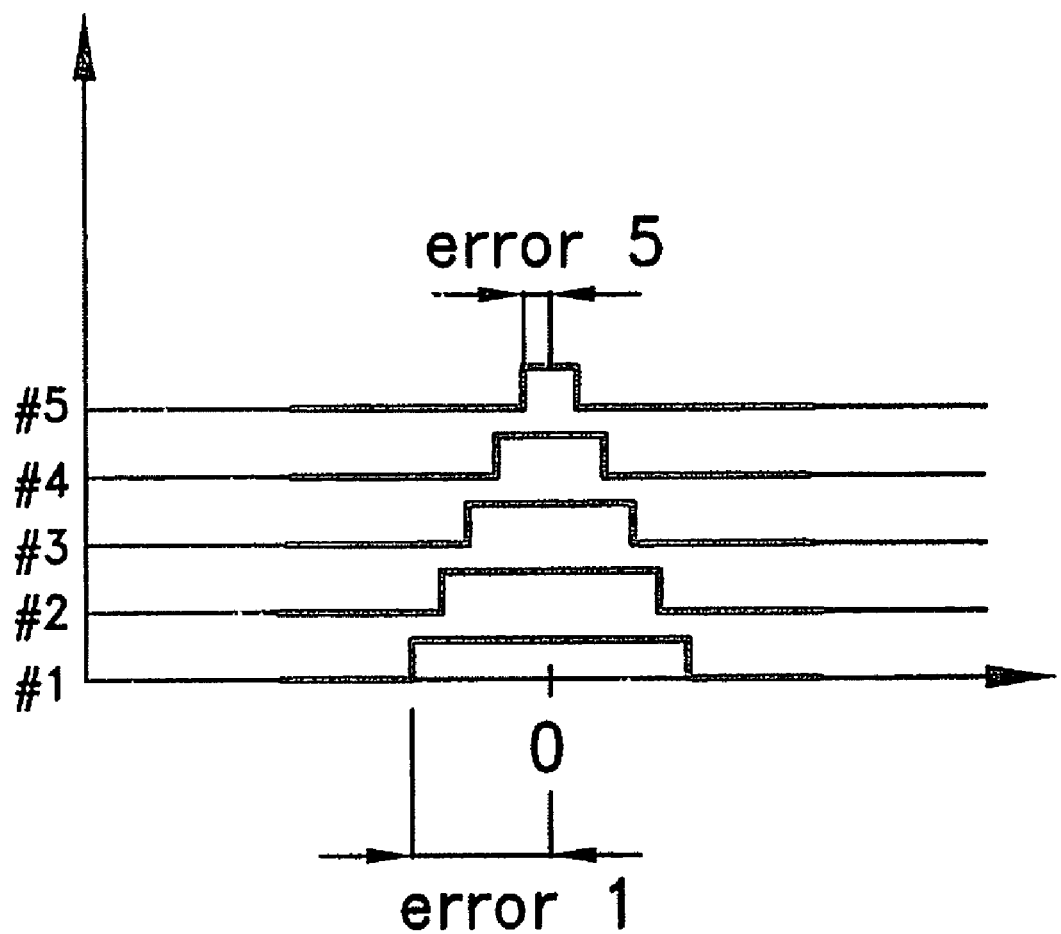
FIG. 3 shows how the error in the deviation, or error, in the accuracy of direction is determined.

FIG. 3 illustrates an example for the providing of an impulse of correction to the projectile. As previously said, the amount of the error is proportional (directly or inversely, depending on the cover's shape) to the width of the measured pulse. The error can likewise be measured from the center of the pulse indicated as "0", as shown in FIG. 3 ("error 1" and "error 5" represent two different errors relating pulse #1 and pulse #5 respectively). As said, an impulse at the back of the projectile that will best correct the course of the projectile to the target is one which is directed opposite to the opening 21 longitudinal axis of symmetry (assuming that the opening is symmetric), and which is activated at the time of the pulses center (time "0"). For example, if in FIG. 2b the pulse center occurs exactly when the opening 21 faces up, the resulted impulse should be directed exactly downward. The time of the center of each present pulse can be determined by dividing the width D of the previously measured pulse by 2, assuming that the width of the present pulse is the same as the width D of the previous one, and by measuring time D/2 from the beginning of the present pulse. This assumption is generally very accurate, as the pulse width almost does not change between two consecutive revolutions.

It should be noted herein that although the explanation above has referred to a shaped "cover", or "opening" of the projectile, this is not a requirement, and has been done for the sake of brevity only. Various alternative optical solutions are known in the art for enabling the passage of light within a shaped area and blocking elsewhere. For example, the borders of the "opening" can be provided by means of a filter or mask, which allows light (in the required wavelength) within a specific area having a shape with characteristics described, and blocking such light elsewhere. In such a case, the cover itself may have other shapes then described, and the "shape" may be determined by the filter. Still alternative solution may be to provide a shaped aperture below the cover, in the light passage to the sensor. Various other similar solutions may be adapted for providing a shaped "opening", all are within the scope of the invention. Therefore, in this application and the claims when the term shaped "cover" or shaped "opening" is used, such term intends also to cover said alternatives.

As has been shown, the output signals from the light sensor of the invention are very simple signals. The processing of said signals involves only measurement of the duration of the pulse which is produced, calculation of the duty cycle, and determination from these two values the accuracy of direction. The determination of the width of the pulse, as well as said other determinations are simple, and well suited to digital processing.

According to the present invention the flight correcting unit may alternatively be of other types known in the art. For example, in the case of using the seeker of the invention in a guided missile, the flight correcting unit 62 may comprise the wings of the missile, and the correction may involve changing the orientation of the wings in a known manner in order to obtain the flight correction as determined by processor 60. The direction of correction and the volume of correction can, in any case, be determined as described above.

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

What is claimed is:

1. A projectile seeker which comprises:
   a. A hollow in the projectile for accommodating a light sensor;
   b. A light sensor located within said hollow for sensing light which is emitted or reflected from a target, and for producing an electronic signal upon sensing such emitted light;
   c. A longitudinal shaped opening at the slanted front-side surface of the projectile for enabling a shaped field of view to said light sensor which is limited by the boundaries of said opening, the opening width varies in a direction from the front to the back of the projectile in order to cause said electronic signal to depend on the spinning of the projectile and to be proportional to the orientation of the projectile with respect to the object.

2. Seeker according to claim 1, wherein in transversal cross-section of the projectile, at least one boundary of the shaped opening is at most only partially, if at all coincides, with an imaginary radial line made in the said transversal cross-section.

3. Seeker according to claim 1, wherein the opening is covered, and wherein the cover is transparent to only a specific light wavelength.

4. Seeker according to claim 1, comprising a filter for allowing passage of light only in a specific wavelength to the light sensor.

5. Seeker according to claim 1 wherein the wavelength of the emitted or reflected light is specific, and the said light sensor is limited to sense light only in said specific wavelength.

6. Seeker according to claim 1 wherein said projectile is further provided with a processor for receiving said electronic signal and for calculating from said electronic signal one or more correcting signals that are provided to a flight correcting unit within the projectile.

7. Seeker according to claim 6 wherein said flight correcting unit is capable of correcting the projectile flight based on said correcting signals.

8. Seeker according to claim 7 wherein said flight correcting unit comprises one or more jets around the projectile, and wherein said correcting signals determine the jets for activation, time of activation, and amount of thrust to be produced by each jet.

9. Seeker according to claim 7 wherein the flight correcting unit comprises wings whose location and/or orientation is changed based on said correcting signals.

10. Seeker according to claim 6, further provided with timer means for determining the time of activation of the processor.

11. Seeker according to claim 1 wherein the width of the opening is increased in the direction from the front to the back of the projectile.

12. Seeker according to claim 11 wherein the opening width increase is non-linearily changed in the direction from the front to the back of the projectile.

13. Seeker according to claim 11 wherein the opening width decrease is non-linearily changed in the direction from the front to the back of the projectile.

14. Seeker according to claim 13 wherein said timer means is fed with the range to the target and with the projectile velocity prior to shooting, in order to determine said processor activation time.

15. Seeker according to claim 1 wherein the width of the opening is decreased in the direction from the front to the back of the projectile.

16. Projectile seeking system which comprises a seeker according to claim 1, and a light pointer for impinging light on the target, and wherein the light sensor of the seeker is adapted to sense light in the wavelength of the light produced by the light pointer.

17. Seeker according to claim 1 wherein the wavelength of the emitted or reflected light is within the UV bandwidth.

18. Seeker according to claim 1 wherein the wavelength of the emitted or reflected light is within the IR bandwidth.

* * * * *